United States Patent [19]

Canty

[11] Patent Number: 4,749,617

[45] Date of Patent: Jun. 7, 1988

[54] COMPOSITE ARTICLE CONTAINING RIGID LAYERS

[75] Inventor: George Canty, Woodbury, Minn.

[73] Assignee: Minnesota Mining and Manufacturing Company, St. Paul, Minn.

[21] Appl. No.: 810,409

[22] Filed: Dec. 18, 1985

[51] Int. Cl.$^4$ .................. B32B 27/06; G11B 5/66
[52] U.S. Cl. .................... 428/332; 428/474.4; 428/482; 428/500; 428/694; 428/518; 428/424.2; 428/508; 428/447; 428/195; 420/532
[58] Field of Search .............. 428/332, 474.4, 482, 428/900, 694

[56] References Cited

U.S. PATENT DOCUMENTS

| | | |
|---|---|---|
| 3,017,280 | 1/1962 | Yudelson .................. 106/125 |
| 3,471,359 | 10/1969 | Goldstein .................. 528/424 |
| 3,704,167 | 11/1972 | Yamamoto et al. ............ 117/239 |
| 4,167,414 | 9/1979 | Morgan .................... 96/87 R |
| 4,181,528 | 1/1980 | Work, III et al. ............ 428/474 |
| 4,194,940 | 3/1980 | Damico et al. .............. 428/474.4 |
| 4,241,169 | 12/1980 | Work, III et al. ............ 430/532 |
| 4,418,164 | 11/1983 | Logullo, Sr. et al. .......... 523/207 |

*Primary Examiner*—P. C. Ives
*Attorney, Agent, or Firm*—Donald M. Sell; James A. Smith; James V. Lilly

[57] ABSTRACT

An article having two rigid layers joined by an aziridine-containing layer is provided.

29 Claims, No Drawings

COMPOSITE ARTICLE CONTAINING RIGID LAYERS

TECHNICAL FIELD

The present invention concerns articles containing two or more rigid layers joined together. More specifically it concerns composite articles having two or more rigid layers joined to one another via an aziridine-containing bonding layer.

BACKGROUND ART

Composite articles containing two or more rigid layers are known. Examples of such articles include magnetic recording tapes and discs, abrasive laminates, flexible printing plates, printable label stock and the like. A major problem in satisfactorily joining two or more of such materials together is their inability to adhere adequately to one another.

A number of techniques have been employed to overcome this problem. Such techniques include subjecting one or more of the surfaces to be bonded to high energy, such as from corona discharge, electron beam discharge, flame treatment and the like. Alternatively, chemical treatments such as modifying the surfaces by chemical etching, and applying primer layers have been employed. Such techniques require the use of expensive equipment and may expose the operator to high energy radiation or dangerous chemicals. Furthermore, they have not proven to be entirely satisfactory.

Examples of chemical treatments include treating the surface with para-chlorophenol. However, this approach provides only minimal improvement in adhesion and suffers from the major disadvantage that para-chlorophenol is hazardous to human health.

Application of primers has also been less than satisfactory. Often the substrate surface must be treated in some way (e.g., subjected to high energy) in order that the primer will exhibit sufficient adhesion to it. Also, primers frequently must be compounded to meet the needs of a specific coating or class of such coatings.

Yet another approach is to incorporate aziridine-containing materials into functional coatings (e.g., reflective layers, antihalation layers, gelatin layers, etc.) which contain groups reactive with the aziridine functionality. These coatings are then applied to a substrate. See, for example, U.S. Pat. Nos. 3,017,280; 4,167,414; 4,181,528; and 4,241,169.

These references disclose that the substrate and the functional coatings must each contain groups reactive with the aziridine group so that the aziridine essentially acts as a tie layer to better anchor the functional coatings to the substrate through crosslinking reactions. They also generally disclose that substrates which do not inherently contain the requisite surface functionality to react with the aziridine (i.e., inert materials) must undergo prior modification by oxidative treatment to incorporate that functionality. Such substrates include, for example, conventional polyesters such as poly(ethylene terephthalate), conventional polyolefin films such as polyethylene, polypropylene and polystyrene.

U.S. Pat. No. 3,704,167 discloses the use of polyaziridine-functional materials to improve the adhesion of a subsequently applied magnetic recording layer to an antihalation layer on motion picture (i.e. cinema) film.

U.S. Pat. No. 4,418,164 discloses coating aramid filaments with polyfunctional aziridines. The coated filaments are used as reinforcing fibers in unsaturated polyester matrices wherein they are totally encased in the matrices.

Copending application Ser. No. 745,261, filed June 14, 1985 (Canty et al.), discloses the use of a composition consisting essentially of a compound having at least one aziridine functionality or group to render an essentially flat surface more adherant to subsequently applied layers. The present invention represents an improvement over that disclosure.

DISCLOSURE OF THE INVENTION

The present invention is directed to articles having at least two rigid layers joined together via an intermediate layer containing an aziridine-functional material and an organic resin. The aziridine-functional material and the organic resin are present in a weight ratio such that there is at least 0.1 part of the resin present for each part of the aziridine-functional material.

The present invention is also directed to processes for adhering two or more rigid layers to one another. In the process the surface of a first rigid layer is treated with a composition containing the aziridine-functional material and the organic resin. The treated surface is then dried, and a second rigid layer is applied to the treated surface of the first layer.

As it is used herein, the term "rigid layer" refers to materials that have a modulus of elasticity either in flexure or in tension of at least 70 MPa at 23° C. and 50% relative humidity when tested in accordance with ASTM Method D747 (1985 Annual Book of ASTM Standards). Within this definition, materials having a modulus of from 70 to 700 MPa are considered to have moderate rigidity while those having a modulus above 700 MPa are considered to have high rigidity.

Surprisingly this improvement is achieved on a wide variety of rigid surfaces, including both inorganic and organic surfaces including metals, glass, ceramics and polymers. These surfaces include normally inert materials such as polyesters and polyolefins. Equally surprising is the fact that the improvement is achieved even if the surface has not undergone oxidative pre-treatment.

The articles of the invention have the highly desirable characteristic that a variety of subsequently applied layers adhere well to the modified surface. Such layers include magnetic recording media (e.g., particulate magnetic materials in a binder), abrasive layers (e.g., particulate abrasive materials in a binder), printable polymer layers, reinforcing polymer backings, radiation sensitive compositions (e.g., diazo systems, photo-reactive polymers, etc.) etc.

The present invention is also useful in the manufacture of stretched surface recording discs. These discs, which comprise a thin polymer film attached to a rigid support, have previously been made using an actinic radiation curable adhesive to adhere the two together. When the present invention is employed, the force holding the polymer film to the rigid support has been found to be dramatically increased.

The articles of the invention can have any shape desired, but are generally sheet-like articles such as tapes, ribbons, films, discs, and the like. Sheet-like materials may have opposed parallel surfaces and are generally substantially thinner than they are either wide or long. However, also included in this definition are articles which are substantially thicker and which need not have opposed parallel surfaces.

The articles of the invention demonstrate excellent room temperature shelf stability as there is no measurable reduction in the adhesion of the high modulus layers to one another even though the articles have been stored for extended periods of time.

DETAILED DESCRIPTION

The aziridine-containing compounds useful in the invention include any compound containing at least one aziridine functionality, and preferably 2 or more aziridine functionalities. Other functional groups may be present in the aziridine-containing material. However, it is preferred that these other groups be non-reactive with the aziridine functionality under ambient conditions. Thus, for example, the aziridine-functional compound may also contain one or more hydroxyl groups.

The aziridine-functional compounds useful in the present invention may be represented by the formula

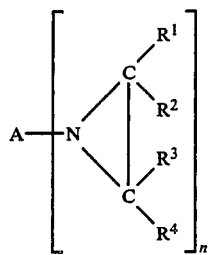

wherein A is an n valent organic or inorganic group, n is a whole number of at least one (preferably 2 to 4), and $R^1$, $R^2$, $R^3$ and $R^4$ may be the same or different and are individually selected from the group consisting of hydrogen and lower alkyl (branched or straight chain) groups containing from 1 to 8 (preferably from 1 to 4) carbon atoms.

The nitrogen atom of the aziridine group is preferably linked to an atom having a valence of 4 or 5 (most preferably C or P). Preferably, $R^1$, $R^2$ and $R^3$ are each hydrogen and $R^4$ is selected from hydrogen and alkyl containing from 1 to 4 (most preferably 1 to 2) carbon atoms.

"A" may be an aliphatic, aromatic or alicyclic organic radical which may contain atoms such as oxygen, sulfur, nitrogen, etc. A may also be an inorganic radical, such as

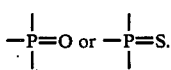

"A" preferably is

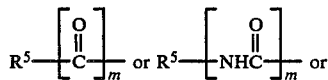

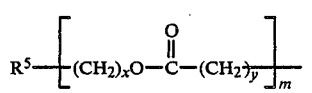

where $R^5$ is an m-valent aliphatic, aromatic or alicyclic radical which may contain atoms other than carbon, e.g., oxygen, nitrogen or sulfur, m is a whole number of at least 1, and x and y are individually 0, 1 or 2.

Specific examples of useful aziridine-containing materials include

A. "CX-100" available from Polyvinyl Chemical Industries and believed to have the formula (FORMULA A)

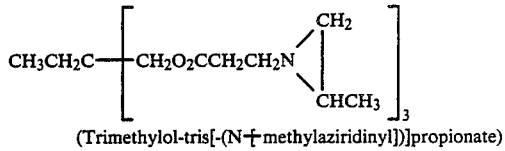

(Trimethylol-tris[-(N⫪methylaziridinyl])]propionate)

B. "XAMA-7" available from Cordova Chemical Company and believed to be a mixture of (FORMULA B1)

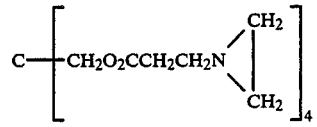

and (FORMULA B2)

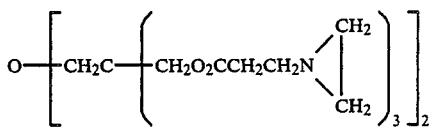

C.

(FORMULA C)

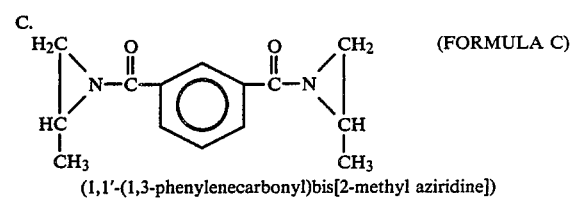

(1,1'-(1,3-phenylenecarbonyl)bis[2-methyl aziridine])

D.

(FORMULA D1)

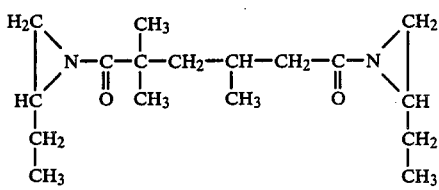

(FORMULA D2)

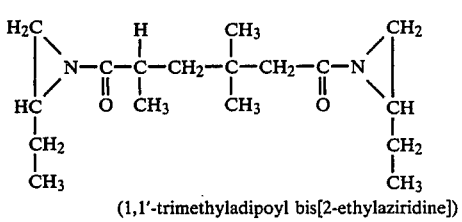

(1,1'-trimethyladipoyl bis[2-ethylaziridine])

E.

(FORMULA E)

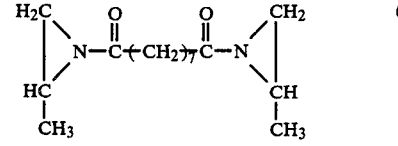

(1,1'-azelaoyl bis[2-methyl aziridine])

F.

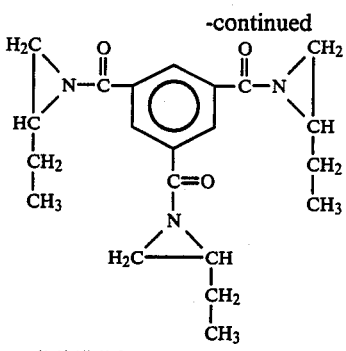

(1,1′,1″-(1,3,5-benzenetriylcarbonyl)tris[2-ethylaziridine])

G.

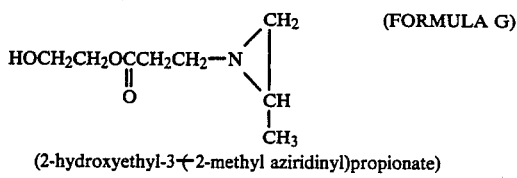

(2-hydroxyethyl-3-(2-methyl aziridinyl)propionate)

H.

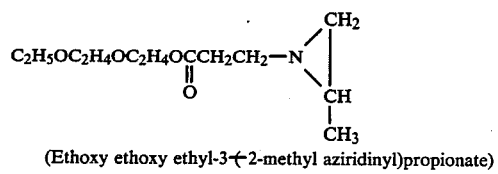

(Ethoxy ethoxy ethyl-3-(2-methyl aziridinyl)propionate)

I.

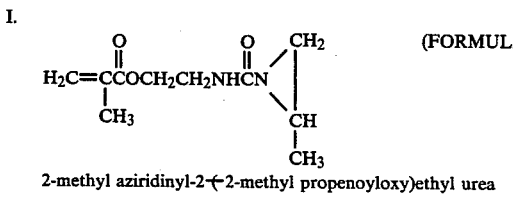

2-methyl aziridinyl-2-(2-methyl propenoyloxy)ethyl urea

The organic resins useful in the intermediate layer are essentially amorphous (i.e., non-crystalline). A wide variety of materials are useful as the organic resin. Examples of useful materials include vinyl resins such as polyvinyl chloride, copolymers of vinyl chloride and vinyl acetate (e.g., VYHH, VAGH, and VMCH from Union Carbide), cellulose acetate butyrate, cellulose acetate propionate and cellulose acetate. Other useful resins include ethyl, methyl and butyl methacrylate homopolymers and copolymers of said homopolymers with methyl, ethyl and butyl acrylate (e.g., the Acrysol ® and Acryloid ® series of resins from Rohm and Haas), urethane polymers such as the polyester-functional urethanes (e.g., the Estane ® series of resins from B. F. Goodrich), polyester and polyether-functional aliphatic urethane resins (e.g., the QI and PE series of resins from Quin), urethane emulsions such as the polyester-urea urethanes (e.g., the Witco ® series of resins from Witco Chemical Company, the Spensol ® series from Spenser Kellogg Co., and the Neo-Rez series from Polyvinyl Chem. Ind.), linear polyester resins (e.g., the Vitel series of resins from Goodyear), and sulfo-polyesters such as those disclosed in U.S. Pat. Nos. 4,480,085, 4,330,588, 4,052,368, 4,300,580, 4,304,901, and 4,525,141 at col. 2, line 66—col. 3, line 15 and col. 4, line 29—col. 5, line 68. If sulfopolyesters are employed it is most preferred that they be amorphous and soluble in water and/or organic solvent.

Most preferably, the organic resins are selected from nonionic and anionic organic resins. The nonionic resins are those which are essentially free from groups which impart a net ionic charge to the polymer. The anionic resins are those which contain pendant anionic groups or groups which induce a net anionic or negative charge to the polymer.

As noted above, there is at least 0.1 part by weight of organic resin to 1 part of aziridine material. Preferably there are from 0.2 to 80 parts of organic material present per part of the aziridine material. Most perferably there are from 0.67 to 4 parts of organic material per part of aziridine material.

The thickness of the intermediate layer is not critical to the present invention and consequently may vary over a wide range. Moreover, the layer need not be either continuous over the surfaces to be joined or uniform in thickness, although continuous, uniform layers are preferred. Normally, suitable bonding of the two high modulus layers is achieved if the intermediate layer is at least 0.005 micron ($\mu$) thick. The layer may be as much as $5\mu$ thick or thicker although no advantage has been noted at thicknesses greater than $5\mu$.

As noted, both organic and inorganic surfaces can be joined together in the practice of the invention. Examples of organic surfaces include polyesters (e.g., saturated and unsaturated, linear and branched) such as poly(ethylene terephthalate), poly(1,4-cyclohexylenedimethylene terephthalate), poly(ethylene naphthalate), polymers of maleic anhydride and ethylene glycol, polymers prepared from ethylenically unsaturated monomers such as polyethylene, polypropylene, polymethylmethacrylate, polyvinyl fluoride, polyvinylidene fluoride, polystyrene, polyvinyl chloride, polyvinyl acetate, polymethylmethacrylate, copolymers of ethylene and acrylic acid, copolymers of ethylene and vinyl acetate, polycarbonates such as the Lexan TM series of materials available from General Electric, polyimides such as the Kapton TM series of materials available from DuPont, polyamides such as the Dartek TM series of nylon materials available from DuPont, cellulose acetates, polydimethylsiloxanes and the like. Oriented and unoriented organic surfaces may be used in the practice of the invention. Examples of useful inorganic surfaces include metals (such as aluminum, copper, etc.), glass and ceramic.

It is also possible to join one or more rigid layers comprising an organic material and an inorganic material. For example, a rigid layer containing an organic resin and an inorganic particulate material may be joined to another rigid surface in the present invention.

It is easy to apply the intermediate layer in the present invention. For example, a first surface is first preferably cleaned to remove dirt and grease using known cleaning techniques. The surface may then be contacted with a composition containing the aziridine-containing compound and organic resin using a variety of techniques such as brushing, spraying, roll coating, curtain coating, knife coating, etc. The coated surface may then be processed at a time for a temperature so as to dry the coating and form a dry, intermediate layer on the coated surface.

A wide range of processing temperatures may be used to form the intermediate layer provided that the particular temperature employed is sufficient to provide good bonding between the high modulus surfaces to be joined but not so high as to degrade either the surface being coated or the intermediate layer. Typical processing temperatures employed are from 15 to 250°C. Best results are obtained when the coating is dried at a temperature of at least 100° C. for a period of time, assuming that the surface to which the intermediate layer has been applied can withstand that temperature.

By appropriate selection of the coating composition and processing conditions the intermediate layer can be rendered insoluble in common solvents for the substrate. Thus, for example, after being formed on a polyester surface, the layer cannot be dissolved in common solvents for polyester such as trifluoroacetic acid.

For example, an insoluble intermediate layer results when the coating composition is applied to unoriented polyester film followed by biaxial orientation and heat setting using known techniques.

The coating composition may also be applied to a previously length oriented polyester film followed by width orientation and heat setting using known techniques. In this process the intermediate layer tends to be a little thicker than in the previous process (e.g., from 0.1 to 0.4μ thick).

The coating composition employed to provide the intermediate layer generally comprises aziridine-containing compound, the organic resin and a liquid vehicle such as water or organic solvent. Examples of organic solvents useful in such compositions include acetone, dichloroethane, butyl cellosolve, methyl ethyl ketone, toluene, heptane, xylene, ethyl acetate, etc.

If water is employed as the liquid vehicle, it is preferred that a surfactant material also be included in the composition. The surfactant may comprise up to 2.5 times the weight of the aziridine component. Anionic, cationic, non-ionic, or amphoteric surfactant materials may be employed. Examples of useful surfactants include octylphenoxy polyethoxy ethanol, alkylaryl polyethersulfonates, ethoxylated fluorochemical alcohols, fluoroaliphatic polyesters, etc.

It is also permissible to employ other ingredients such as slip agents, colorants (e.g., dyes and pigments), antioxidants, UV light stabilizers and the like in the coating composition. These ingredients should either be essentially non-reactive with the aziridine-containing material under normal conditions, or be present in insignificant amounts so that they do not interact with the aziridine functionality.

Within these guidelines, varying amounts of these other ingredients may be employed. For example, slip agents, colorants, antioxidants and UV light stabilizers may comprise up to 5 percent by weight of the treatment composition.

The intermediate layer is uniquely suited to being prepared by continuous in-line manufacturing processes. The coating composition may be applied to either unoriented, partially oriented, or fully oriented webs. Treated unoriented or partially oriented webs may be subsequently further oriented if desired. Conventional orientation conditions may be used in such processes. Thus, the web may be stretched in the lengthwise direction by known techniques and subsequently stretched in the crosswise direction using known techniques. Alternatively, biaxially stretched in both directions at the same time.

A particularly useful manufacturing process comprises the steps of stretching the web in the lengthwise direction at 80–95° C., applying the coating composition to the uniaxially oriented web, drying the coating, stretching the treated, uniaxially oriented web at 100–120° C. in the crosswise direction, and then heat setting the biaxially oriented web at 200–250° C. Typically webs oriented by being stretched to from 1 to 5 times their original dimension wherein the length to width stretch ratio may vary from 1:1 to 1:5 and from 5:1 to 1:1. Other stretch ratios may be used if desired.

After the first surface has been treated, a layer of a second material may be applied to the intermediate layer using known techniques. The second material may be a functional material such as a magnetic recording layer, an abrasive layer, a printable layer, etc., or it may be a layer of a polymeric material. The second layer may be smooth, rough, textured, continuous, intermittent or the like and may vary in thickness if desired.

The present invention will be further explained by reference to the following examples wherein all percents are percents by weight unless otherwise specified. These examples serve to further illustrate the present invention and do not limit it.

EXAMPLE 1

A series of coating compositions were prepared from the following ingredients:

|  | A | B | C | D | E |
|---|---|---|---|---|---|
| Sulfonated Polyester (Prep'd according to Ex. 1 of U.S. Pat. No. 4,330,588) | 0.8 | 0.8 | 0.8 | 0.4 | 0.12 |
| Triton X-100 (Available from Rohm and Haas Co.) | 0.2 | 0.2 | 0.2 | 0.2 | 0.05 |
| CX-100 (Trimethylol-tris [β-(N(methylazirdinyl))]-propionate) available from Polyvinyl Chemical Industries) | 0.05 | 0.02 | 1 | 2.2 | 0.0625 |
| Water | 20 | 20 | 20 | 97.2 | 32.7 |

The ingredients were mixed at room temperature until a uniform dispersion was obtained. The ingredients were then applied to separate pieces of cast unoriented Poly(ethylene terephthalate) film (referred to as PET) using meyer bar coating techniques. After application of the coating composition the PET films were biaxially oriented 2×2 at 90–110° C. and then heat set at 230° C. A magnetizable coating was then applied over the aziridine-containing layer and dried to provide a dry layer about 3μ thick. The magnetizable coating comprised 66 weight percent acicular iron oxide particles having an average length of 0.6 micrometer and an aspect ratio of about 8:1. The binder comprised polyurethane elastomer, phenoxy resin and other ingredients substantially as described in the comparative example of U.S. Pat. No. 4,210,703.

The functional coating was applied using a Meyer rod and then heated in a forced air oven at 71° C. for one minute followed by 82° C. for one minute. The coated substrates were then aged for five days at room temperature and then tested for adhesion using the following scrape adhesion test. The sample to be tested was fastened to a flat, solid, surface with the functional coating being exposed. A "BIC" disposable razor was placed on the coating such that the blade contacted the coating. While applying a force on the razor normal to the coating in excess of 5 kg. the razor was pushed away from the tester at a rate of 10–20 cm/min. The adhesion of the coating to the substrate was observed and rated as follows:

| RATING | OBSERVATION |
| --- | --- |
| Excellent (E) | 100% retention of coating on modified surface |
| Good (G) | 90-100% retention of coating on modified surface. |
| Fair (F) | 75-90% retention of coating on modified surface. |
| Poor (P) | Less than 75% retention of coating on modified surface. |

The calculated coating thickness and the adhesion results obtained are given in Table 1.

TABLE 1

|  | A | B | C | D | E |
| --- | --- | --- | --- | --- | --- |
| Coating Thickness (μ) | 0.13 | 0.12 | 0.25 | 0.043 | — |
| Adhesion Results | E | E | E | E | E |

EXAMPLE 2

Example 1 was repeated using the following coating compositions:

|  | A | B |
| --- | --- | --- |
| Water Based Urethane (R-960 NeoRez - Polyvinyl Chemical Ind.) | 0.4 | 0.12 |
| CX-100 | 2.2 | 0.0625 |
| Triton X-100 | 0.2 | 0.05 |
| Water | 97.2 | 30.8 |

The calculated coating thickness and the adhesion results obtained are given in Table 2.

TABLE 2

|  | A | B |
| --- | --- | --- |
| Coating Thickness (μ) | 0.043 | — |
| Adhesion Results | E | E |

EXAMPLE 3

The following coating compositions were prepared:

|  | A | B | C | D |
| --- | --- | --- | --- | --- |
| Vitel 307 (Linear Polyester from Goodyear) | 0.4 | 0.4 | — | — |
| Urethane (R-960 NeoRez) | — | — | 0.12 | 0.12 |
| CX-100 | 0.04 | 0.08 | 0.0625 | 0.0625 |
| Triton X-100 | — | — | 0.5 | 0.5 |
| Methyl Ethyl Ketone | 8.2 | 8.2 | — | — |
| Toluene | 1.4 | 1.4 | — | — |
| Water | — | — | 25.7 | 25.7 |

The coatings were applied to individual pieces of biaxially orineted PET film and heated for 1 minute at 74° C. and then at 121° C. for 2 min. The thickness of each of the coatings was calculated to be 0.304μ (Samples A & B), 0.15μ (Sample C) and 0.222μ (Sample D).

A manetizable coating was prepared and applied to the dried coating as described in Example 1. The adhesion of the magnetizable coating to each of the substrates was found to be excellent.

EXAMPLE 4

Example 1 was repeated using the following coating compositions:

|  | A | B | C |
| --- | --- | --- | --- |
| Sulfonated Polyester | 0.8 | 0.8 | 0.8 |
| TX-100 | 0.2 | 0.2 | 0.2 |
| CX-100 | 0.01 | 0.5 | 0.2 |
| Water | 29 | 29 | 29 |

The calculated thicknesses and the adhesion results are given in Table 3.

TABLE 3

|  | A | B | C |
| --- | --- | --- | --- |
| Coating thickness (μ) | 0.12 | 0.19 | 0.15 |
| Adhesion | E | E | E |

I claim:

1. A composite article having a rigid layer adhered to a rigid substrate by means of an azirdine-containing intermediate layer comprising an aziridine-functional material and an essentially amorphous organic resin wherein organic resin is present at a level of at least 0.1 part by weight of said organic resin per part by weight of said azirdine-functional material.

2. An article according to claim 1 wherein said intermediate layer is from 0.005 micron to 5 microns thick.

3. An article according to claim 2 wherein said intermediate layer is insoluble in trifluoroacetic acid at 20° C.

4. An article according to claim 1 wherein said substrate is selected from polymeric films, glass and metal.

5. An article according to claim 4 wherein said substrate is polymeric film.

6. An article according to claim 4 wherein said rigid layer is selected from layers comprising inorganic particulate material in an organic binder and a film of a polymeric material.

7. An article according to claim 6 wherein said particulate material is magnetic.

8. An article according to claim 6 wherein said particulate material is an abrasive material.

9. An article according to claim 6 wherein said rigid layer comprises a film of a polymeric material.

10. An article according to claim 1 wherein said aziridine-functional material has the formula

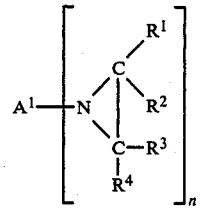

wherein $A^1$ is an n valent organic or inorganic group; $R^1$, $R^2$, $R^3$ and $R^4$ are independently selected from hydrogen and lower alkyl groups; and n is a whole number of at least 1.

11. An article according to claim 1 wherein said aziridine-functional material contains a group having the formula

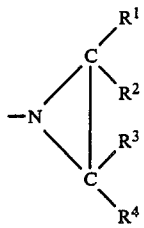

wherein $R^1$, $R^2$, $R^3$ and $R^4$ are independently selected from hydrogen and lower alkyl groups.

12. An article according to claim 1 wherein said layer comprises a magnetic recording medium.

13. A rigid article according to claim 12.

14. A flexible article according to claim 12.

15. An article comprising a rigid support having opposed parallel major surfaces,
a first aziridine-containing layer on one of said major surfaces comprising an aziridine-functional material and an essentially amorphous organic resin wherein said organic resin is present in an amount of at least 0.1 part by weight per part by weight of said aziridine-functional material,
a second layer on said first layer comprising an actinic radiation curable adhesive, and
a polymeric film on said second layer.

16. An article according to claim 15 wherein said support is polyester.

17. An article according to claim 16 wherein said polymeric film comprises polyester.

18. An article according to claim 15 wherein said support comprises polyphenylene sulfide.

19. An article according to claim 15 wherein said support comprises polyether imide.

20. An article according to claim 1 or 15 wherein said organic resin is selected from nonionic and anionic polymers.

21. An article according to claim 20 wherein said organic resin is a nonionic polymer.

22. An article according to claim 20 wherein said organic resin is an anionic resin.

23. An article according to claim 22 wherein said organic resin is selected from ethyl, methyl and butyl methacrylate homopolymers, copolymers of said methacrylate homopolymers with methyl, ethyl and butyl acrylate, polyester-functional polyurethanes, polyester-urea polyurethanes and sulfopolyesters.

24. An article according to claim 23 wherein said organic resin is said sulfopolyester.

25. An article according to claim 20 wherein said organic resin is present in an amount of from 0.2 to 80 parts by weight per part by weight of said aziridine-functional material.

26. An article according to claim 25 wherein said organic resin is present in an amount of from 0.67 to 4 parts by weight per part by weight of said aziridine-functional material.

27. An article according to claim 20 wherein said intermediate layer is at least 0.005 micron thick.

28. An article according to claim 26 wherein said intermediate layer is in the range of from 0.04 to 1$\mu$ thick.

29. An article according to claim 15 further comprising a layer of magnetic recording media on said polymeric film.

* * * * *